United States Patent
Sonoda

(10) Patent No.: US 8,427,784 B2
(45) Date of Patent: Apr. 23, 2013

(54) HEAD SLIDER HAVING TRAILING END CONFIGURATION OF A GROOVE FORMED AT A BOUNDARY BETWEEN A TRAILING STEP AND A TRAILING PAD FOR ADAPTATION WITH A GIMBAL ASSEMBLY AND DISK DRIVE

(75) Inventor: Koji Sonoda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/326,914

(22) Filed: Dec. 15, 2011

(65) Prior Publication Data

US 2012/0275063 A1    Nov. 1, 2012

(30) Foreign Application Priority Data

Apr. 28, 2011    (JP) .................................. 2011-100791

(51) Int. Cl.
G11B 5/60    (2006.01)
(52) U.S. Cl.
USPC ................... 360/235.7; 360/236.5; 360/236.6
(58) Field of Classification Search ..... 360/235.4–237.1
See application file for complete search history.

(56) References Cited

U.S. PATENT DOCUMENTS 5,991,118 A  * 11/1999  Kasamatsu et al. ........ 360/236.6
2010/0142094 A1 * 6/2010  Fujimaki et al. ........... 360/235.4

FOREIGN PATENT DOCUMENTS

| JP | 61-204384 | 9/1986 |
| JP | 05-189907 | 7/1993 |
| JP | 09-106528 | 4/1997 |
| JP | 09-245451 | 9/1997 |
| JP | 2002-100143 | 4/2002 |
| JP | 2002-358744 | 12/2002 |
| JP | 2006-286104 | 10/2006 |
| JP | 2009-271974 | 11/2009 |

OTHER PUBLICATIONS

Japanese Office Action dated Apr. 24, 2012, filed in Japanese counterpart Application No. 2011-100791, 4 pages (with English translation).

* cited by examiner

*Primary Examiner* — Allen Heinz
(74) *Attorney, Agent, or Firm* — Patterson & Sheridan, LLP

(57) ABSTRACT

According to one embodiment, a magnetic head includes a head slider including a bearing surface opposed to a surface of a recording medium, an inflow end face, and an outflow end face, and configured to fly by an airflow between the recording medium surface and the bearing surface, and a recording element and a reproduction element disposed in an outflow end portion of the head slider with respect to the airflow. The bearing surface of the head slider includes a trailing step on the outflow end portion, a trailing pad on the trailing step and includes an outflow end kept at an inflow-side gap away from the outflow end face, and a first groove formed along a step portion at a boundary between the trailing step and the trailing pad.

20 Claims, 6 Drawing Sheets

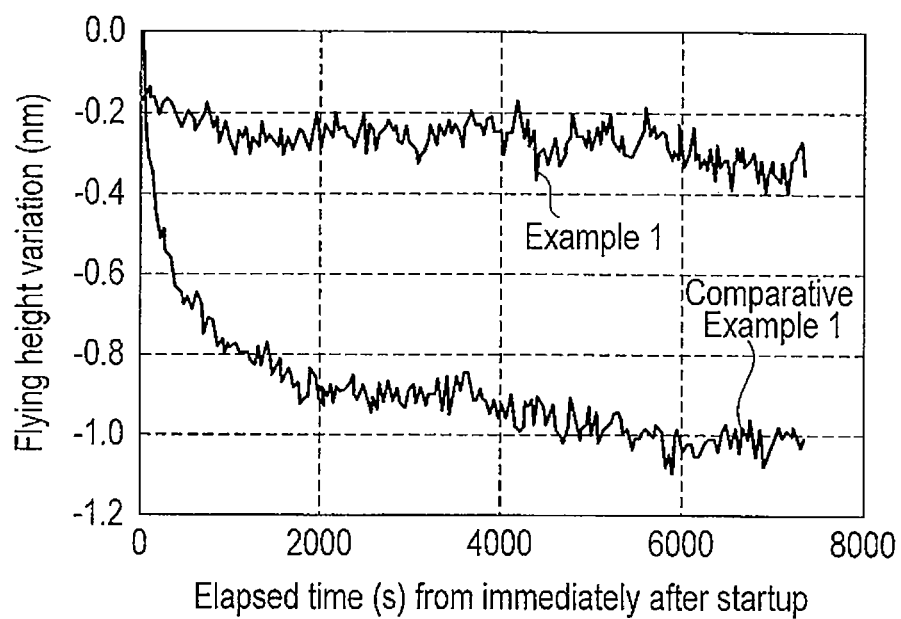
F I G. 8

| | Groove | | | | Surface roughness Ra of ABS (nm) | ΔFH (nm) |
|---|---|---|---|---|---|---|
| | First step portion | Second step portion | Width | Depth | | |
| Example 1 | ○ | ○ | 5 μm | 100 μm | 2 | 0.2 |
| Example 2 | ○ | – | 5 μm | 100 μm | 2 | 0.3 |
| Example 3 | ○ | ○ | 5 μm | 100 μm | 0.5 | 0.1 |
| Example 4 | ○ | ○ | 10 μm | 100 μm | 2 | 0.5 |
| Comparative Example 1 | – | | | | | 1.0 |

F I G. 9

HEAD SLIDER HAVING TRAILING END CONFIGURATION OF A GROOVE FORMED AT A BOUNDARY BETWEEN A TRAILING STEP AND A TRAILING PAD FOR ADAPTATION WITH A GIMBAL ASSEMBLY AND DISK DRIVE

CROSS-REFERENCE TO RELATED APPLICATIONS

This application is based upon and claims the benefit of priority from the prior Japanese Patent Application No. 2011-100791, filed Apr. 28, 2011, the entire contents of which are incorporated herein by reference.

FIELD

Embodiments described herein relate generally to a head used in a disk drive, such as a magnetic disk drive, a head gimbal assembly provided with the head, and the disk drive.

BACKGROUND

A disk drive, such as a magnetic disk drive, comprises a magnetic disk for use as a recording medium, spindle motor, magnetic head, and carriage assembly. The magnetic disk is disposed in a case. The spindle motor supports and rotates the disk. The magnetic head reads data from and writes data to the disk. The carriage assembly supports the head for movement relative to the disk. The magnetic head comprises a slider mounted on a suspension of the carriage assembly and a head section on the slider. The head section comprises a recording element for writing and a reproduction element for reading.

The slider comprises a bearing surface (air-bearing surface or ABS) opposed to a recording surface of the magnetic disk. The head slider is subjected to a predetermined head load produced by the suspension and directed to a magnetic recording layer of the disk. When the magnetic disk drive is operating, an airflow is produced between the rotating disk and head slider, and the ABS of the slider is subjected to a force (positive pressure) that causes the slider to fly from the recording surface of the disk, based on the principle of air lubrication. The head slider can be caused to fly with a gap from the recording surface of the disk by balancing this flying force with the head load.

In recent years, to meet the demand for increased recording density, increasing importance has been attached to reduction in head flying height and flying-height control in a low-height area, and development of technologies for dynamically controlling the head flying height has been rapidly advanced. Under the present circumstances, a flying gap between a magnetic disk and a slider of a magnetic head in the vicinity of a read/write element is 10 nm or less. Further, the gap between the read/write element and disk for read/write operation is reduced to approximately several nanometers by additionally using a technology (DFH) such that the magnetic spacing is controlled by making the read/write element project dynamically.

As a result, some problems have become apparent. For example, a lubricant applied to the disk surface is transferred to the ABS of the head slider flying above the magnetic disk, the magnetic spacing is enlarged, and the flying performance of the slider is rendered unstable.

The lubricant transferred to the ABS of the slider of the magnetic head is moved onto the air-outflow end face of the head slider by the airflow and accumulates there. If the transferred lubricant accumulates in excess, the flying height of the slider becomes unstable. Thereupon, a problem of high-fly write (HFW) occurs such that recording and reproduction signals are unstable. Further, there is such a problem that the reproduction signals vary when the magnetic disk drive is started up, since the lubricant diffuses and returns to the read/write element portion on the ABS side while the magnetic head is being unloaded with the disk drive off.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 8 is a diagram showing relationships between the elapsed time from immediately after startup and flying height variations for magnetic heads according to Example 1 and Comparative Example 1; and FIG. 9 is a diagram comparatively showing the presence of grooves, groove width and depth, surface roughness, and flying height variations of the magnetic heads of Example 1 and Comparative Example 1.

DETAILED DESCRIPTION

Various embodiments will be described hereinafter with reference to the accompanying drawings. In general, according to one embodiment, a magnetic head comprises: a head slider comprising a bearing surface opposed to a surface of a recording medium, an inflow end face, and an outflow end face, and configured to fly by an airflow between the recording medium surface and the bearing surface; and a recording element and a reproduction element disposed in an outflow end portion of the head slider with respect to the airflow. The bearing surface of the head slider comprises a trailing step on the outflow end portion, a trailing pad on the trailing step and comprising an outflow end kept at an inflow-side gap away from the outflow end face, and a first groove formed along a step portion at a boundary between the trailing step and the trailing pad.

An embodiment in which a disk drive is applied to a hard disk drive (HDD) will now be described in detail.

Figure 1:
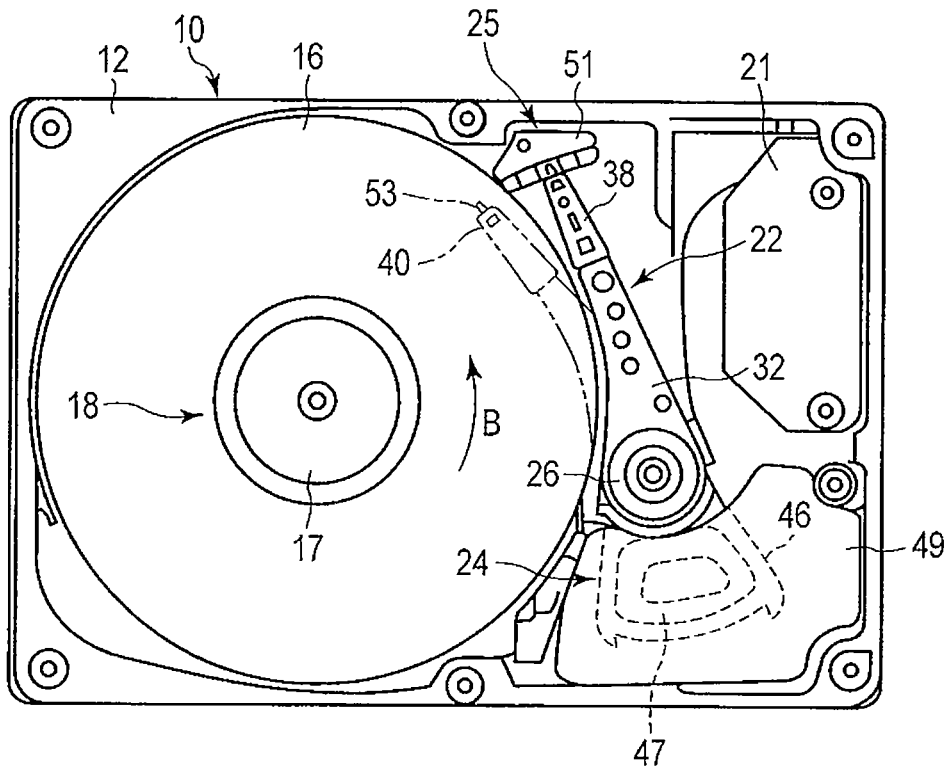
FIG. 1 is a plan view showing an HDD according to an embodiment.
Figure 2:
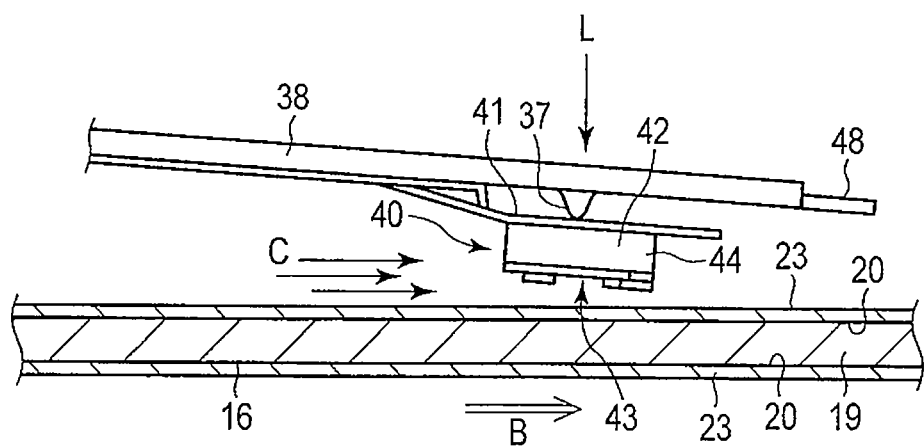
FIG. 2 is an enlarged side view showing a magnetic head section of the HDD.

FIG. 1 shows the internal structure of the HDD with its top cover removed, and FIG. 2 shows a flying magnetic head. As shown in FIG. 1, the HDD comprises a housing 10. The housing 10 comprises a base 12 in the form of an open-topped rectangular box and a top cover (not shown), which is attached to the base by screws so as to close the top opening of the base.

In the housing 10, a magnetic disk 16 for use as a recording medium and a mechanical unit are arranged on the base 12. The mechanical unit comprises a spindle motor 18, a plurality (e.g., two) of magnetic heads 40, carriage assembly 22, and voice coil motor (VCM) 24. The spindle motor 18 supports and rotates the magnetic disk 16. The magnetic heads 40 record and reproduce data on and from the magnetic disk. The carriage assembly 22 supports the heads 40 for movement relative to the disk 16. The VCM 24 pivots and positions the carriage assembly 22. Further, a ramp loading mechanism 25, board unit 21, etc., are arranged on the base 11. The ramp loading mechanism 25 holds the magnetic heads in a position off the magnetic disk when the heads 40 are moved to the outermost periphery of the disk. Electronic components, such as a preamplifier, head IC, etc., are mounted on the board unit 21.

A control circuit board (not shown) is attached to the outer surface of the bottom wall of the base 12 by screws. This circuit board controls the operations of the spindle motor 18, VCM 24, and magnetic heads 40 through the board unit 21.

As shown in FIGS. 1 and 2, the magnetic disk 16 comprises a substrate 19 formed of a nonmagnetic disk with a diameter of, for example, about 2.5 inches. A magnetic recording layer 20 is laminated to each surface of the substrate 19, a protective film (not shown) is formed on the magnetic recording layer 20, and in addition, a lubricant 23 (e.g., oil) 23 is applied to a thickness of about 1 nm on the uppermost layer.

The magnetic disk 16 is fitted on a hub (not shown) of the spindle motor 18 and secured to the hub by a clamp spring 17. Thus, the disk 16 is supported parallel to the bottom wall of the base 12. The disk 16 is rotated in the direction of arrow B at a predetermined speed, e.g., 5,400 or 7,200 rpm, by the spindle motor 18.

The carriage assembly 22 comprises a bearing unit 26 secured to the bottom wall of the base 12 and a plurality of arms 32 extending from the bearing unit. These arms 32 are located parallel to the surfaces of the magnetic disk 16 with predetermined spaces therebetween and extend in the same direction from the bearing unit 26. The carriage assembly 22 comprises elastically deformable suspensions 38 each in the form of an elongated plate. Each suspension 38 is formed of a plate spring, the proximal end of which is secured to the distal end of its corresponding arm 32 by spot welding or adhesive bonding and extends from the arm. Each suspension 38 may be integrally formed with its corresponding arm 32.

As shown in FIG. 2, each magnetic head 40 comprises a substantially cuboid head slider 42 and read/write head section 44 on the slider and is secured to a gimbal 41 on the distal end portion of the suspension 38. Each suspension 38 is formed with a dimple or substantially hemispheric protrusion 37 projecting on the magnetic head side in this case. The protrusion 37 is located at that position on the suspension 38 which faces the head mounting portion of the gimbal 41, that is, the central portion of the magnetic head 40. The protrusion 37 abuts a substantially central portion of a flat surface of the head slider 42 with the gimbal 41 between them. The gimbal 41 is elastically pressed against the protrusion 37 by its own elasticity. Thus, the magnetic head 40 and the head mounting portion of the gimbal 41 can be displaced in the pitch and roll directions or vertically around the protrusion 37. Further, the magnetic head 40 is subjected to predetermined head load L produced by the spring force of the suspension 34 and directed to the surface of the magnetic disk 16.

The suspension 38, gimbal 41, magnetic head 40, and arm 32 constitute a head gimbal assembly. The head gimbal assembly need not always comprise the arm 32.

As shown in FIG. 1, the carriage assembly 22 comprises a support frame 46 extending from the bearing unit 26 on the opposite side to the arms 32. This support frame supports a voice coil 47 that constitutes a part of the VCM 24. The support frame 46 is a plastic structure integrally formed on the voice coil 47. The voice coil 47 is located between a pair of yokes secured to the base 12. Thus, the voice coil, along with the yokes and a magnet (not shown) secured to one of the yokes, constitutes the VCM 24. If the voice coil 47 is energized, the carriage assembly 22 pivots around the bearing unit 26, whereupon each magnetic head 40 is moved to and positioned above a desired track of the magnetic disk 16.

The ramp loading mechanism 25 comprises a ramp 51 and tabs 48. The ramp 51 is disposed on the bottom wall of the base 12 and located outside the magnetic disk 16. The tabs 48 extend individually from the respective distal ends of the suspensions 34. As the carriage assembly 22 pivots to a retracted position outside the disk 16, each of the tabs 48 engages with a ramp surface formed on the ramp 51 and is then pushed up the ramp surface, whereupon the magnetic heads 40 are unloaded.

Figure 3:
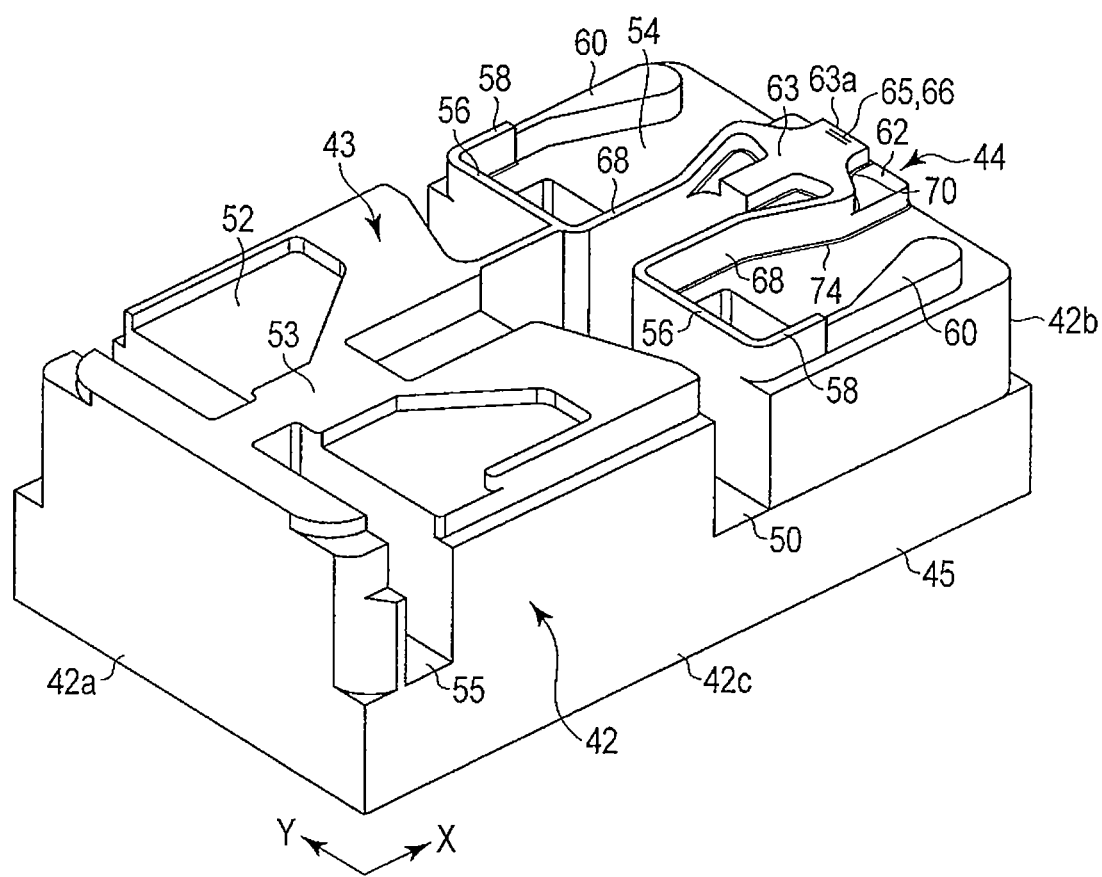
FIG. 3 is a perspective view showing the ABS side of a head slider of the magnetic head.
Figure 4:
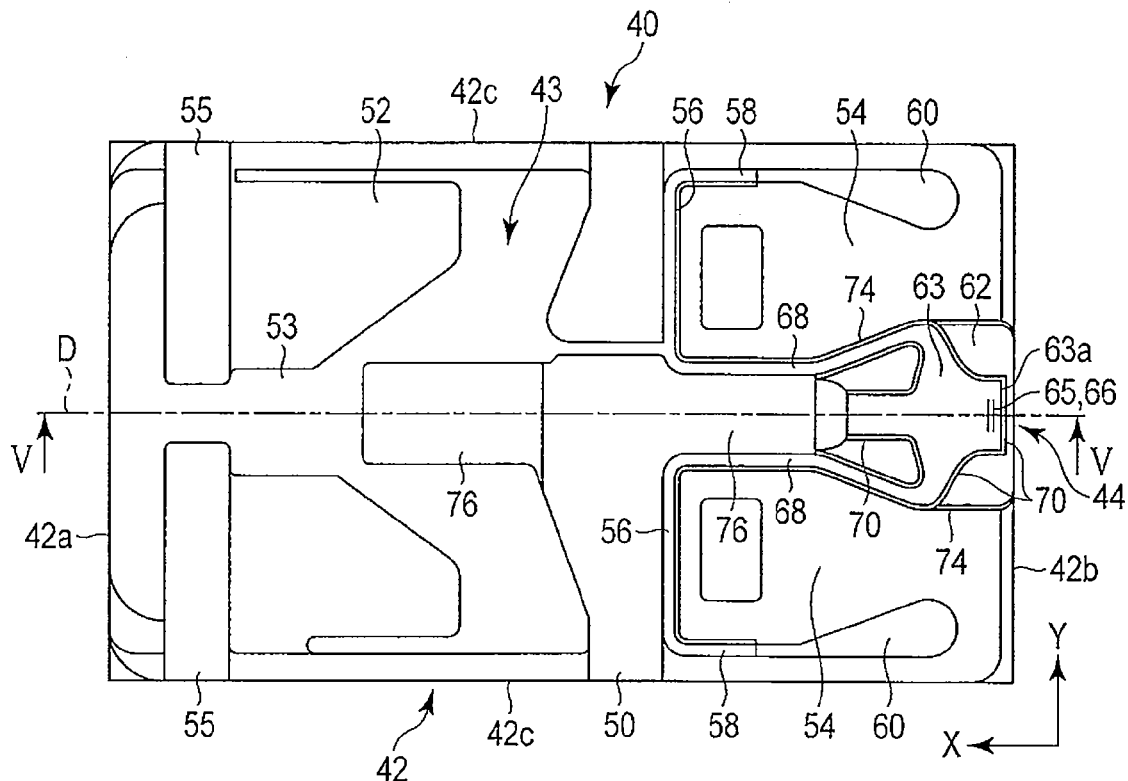
FIG. 4 is a plan view showing the ABS side of the slider.
Figure 5:
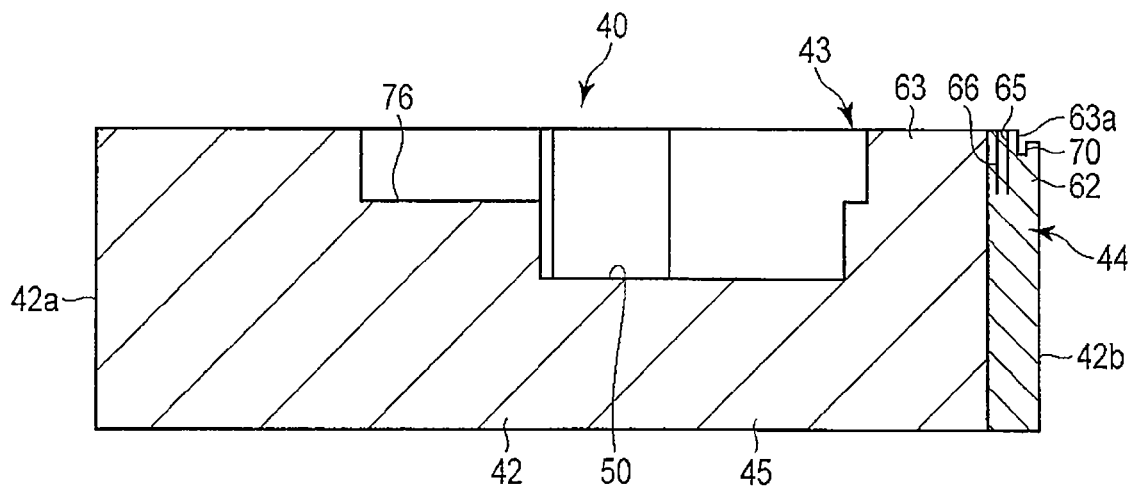
FIG. 5 is a sectional view of the head slider along line V-V of FIG. 4.
Figure 6:
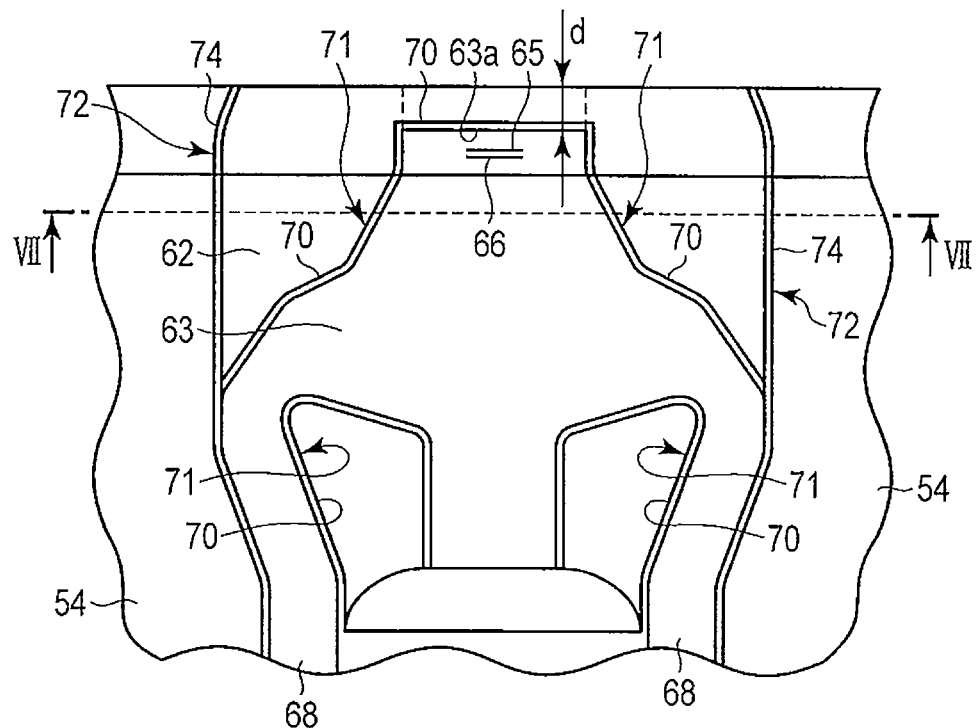
FIG. 6 is an enlarged perspective view showing an outflow end portion of the head slider.
Figure 7:
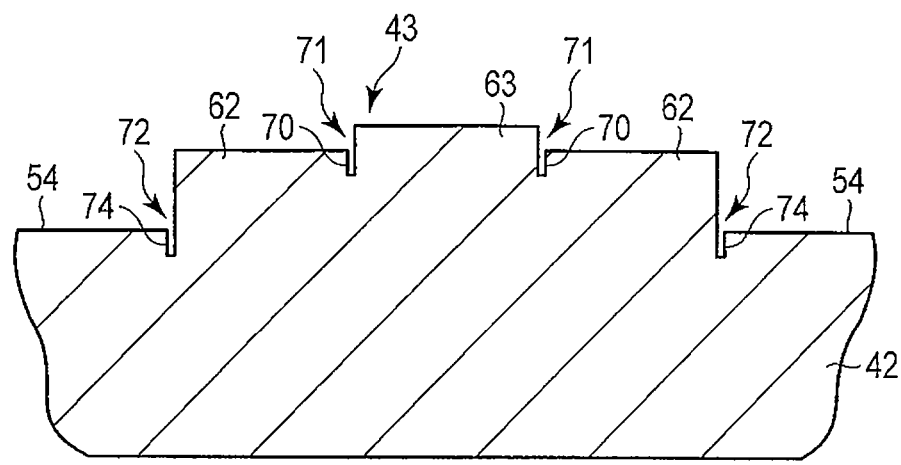
FIG. 7 is a sectional view along line VII-VII of FIG. 6.

The structure of one of the magnetic heads 40 will now be described in detail. FIG. 3 is a perspective view showing the head slider 42 of the magnetic head, FIG. 4 is a plan view of the head slider, and FIG. 5 is a sectional view of the head along line V-V of FIG. 4. FIG. 6 is an enlarged plan view showing a trailing end portion of the slider, and FIG. 7 is a sectional view of the slider along line VII-VII of FIG. 6.

As shown in FIGS. 3 to 5, each magnetic head 40 is constructed as a flying head, which comprises the head slider 42. The slider 42 comprises a slider body 45 and head section 44. The slider body 45 is formed of, for example, a sintered body containing alumina and titanium carbide (AlTic or $Al_2O_3$—TiC). The head section 44 is formed of thin films arranged on the outflow end the slider body 45. The head slider 42 is a substantially cuboid structure as a whole, and comprises a rectangular air-bearing surface (ABS) 43, inflow end face 42a, outflow end face 42b, and a pair of side faces 42c. The ABS 43 is opposed to a surface of the magnetic disk 16. The inflow and outflow end faces 42a and 42b extend perpendicular to the ABS. The side faces 42c extend perpendicular to the ABS between the end faces 42a and 42b.

The longitudinal direction of the ABS 43 is assumed to be a first direction X, and the transverse direction perpendicular thereto to be a second direction Y. The head slider 42 is a so-called femto-slider having a length L of 1.25 mm or less, e.g., 0.85 mm, in the first direction X and a width W of 1.0 mm or less, e.g., 0.7 mm, in the second direction Y.

The head slider 42 is caused to fly by the airflow C (FIG. 2) that is produced between the disk surface and the ABS 43 as the magnetic disk 16 rotates. When the HDD is operating, the ABS 43 of the slider 42 is opposed to the disk surface with a gap therebetween. The direction of the airflow C is coincident with the direction of rotation B of the disk 16. The slider 42 is located on the surface of the disk 16 in such a manner that the longitudinal direction of the ABS 43 is substantially coincident with the direction of rotation B.

As shown in FIGS. 3 to 5, a band-like negative-pressure groove 50 extending throughout the length in the second direction Y is formed substantially in the central portion of the ABS 43. If the head slider 42 is, for example, 0.23 mm thick, the depth of the groove 50 is 800 to 1,500 nm, e.g., 1,500 nm. The negative-pressure groove 50 serves to produce a negative pressure on the central portion of the ABS 43 at every feasible yaw angle for the HDD.

A substantially rectangular leading step 52 is formed at the inflow end portion of the ABS 43. The leading step 52 projects from the bottom surface of the negative-pressure groove 50 and is located on the inflow side of the groove 50 with respect to the airflow C.

In order to maintain the pitch angle of the magnetic head 40, a leading pad 53 that supports the head slider 42 by means of an air film is formed projecting from the leading step 52.

The leading pad 53 is formed in an M-shape, which opens in a plurality of positions toward the inflow side. Further, a negative-pressure groove 55 is formed in a position slightly deviated on the outflow side from the inflow end of the leading step 52. The leading pad 53 and leading step 52 constitute a first pressure generating unit.

A negative-pressure cavity 54, a recess, is formed ranging from a substantially central portion of the ABS 43 to the outflow end side. The negative-pressure cavity 54 is located on the outflow end side of the negative-pressure groove 50 and opens toward an outflow end face 44b of the head slider 42. The negative-pressure cavity 54 is shallower than the negative-pressure groove 50, that is, it is formed in a position higher than the bottom surface of the groove 50.

A rib-like intermediate step 56, a pair of side steps 58, and a pair of skirts 60 are formed on the ABS 43 such that they surround the negative-pressure cavity 54. The intermediate step 56 is located between the negative-pressure groove 50 and negative-pressure cavity 54 and extends in the second direction Y between the opposite side edges of the ABS 43. The intermediate step 56 projects from the bottom surface of the negative-pressure cavity 54 and is located on the inflow side of the cavity 54 with respect to the airflow C.

The pair of side steps 58 are formed individually along the side edges of the ABS 43 and extend from the intermediate step 56 toward the outflow end of the ABS 43. These side steps 58 project from the bottom surface of the negative-pressure cavity 54.

The pair of skirts 60 are formed individually along the side edges of the ABS 43 and extend in the first direction X from the side steps 58 to the vicinity of the outflow end of the ABS 43. The skirts 60 project from the bottom surface of the negative-pressure cavity 54 and are formed lower than the side steps 58.

The intermediate step 56, side steps 58, and skirts 60 are substantially U-shaped as a whole, closed upstream and open downstream. The steps 56 and 58 and skirts 60 define the negative-pressure cavity 54.

As shown in FIGS. 3 to 6, the head slider 42 comprises a trailing step 62 formed on the outflow end portion of the ABS 43 with respect to the airflow C. The trailing step 62 projects from the bottom surface of the negative-pressure cavity 54 so that it is flush with the leading step 52. The trailing step 62 is located substantially in the center of the ABS 43 with respect to the second direction Y. A trailing pad 63 that supports the head slider 42 by means of an air film is formed projecting from the upper surface of the trailing step 62.

The trailing pad 63 is kept at an inflow-side gap away from the outflow end face of the trailing step 62 or the outflow end face 42b of the head slider 42 in this case. Specifically, an outflow end 63a of the trailing pad 63 is deviated from the outflow end edge of the trailing step 62 with gap d on the inflow side.

The trailing pad 63 is formed flush with the leading pad 53, intermediate step 56, and side steps 58, which define the uppermost surface of the head slider 42 that constitutes the ABS 43. The trailing step 62 and trailing pad 63 constitute a second pressure generating unit.

The head section 44 of the magnetic head 40 comprises a recording element 65 and reproduction element 66 for recording data on and reproducing data from the magnetic disk 16. These elements 65 and 66 are embedded in the downstream end portion of the head slider 42 with respect to the direction of the airflow C or in the trailing step 62 in this case. The respective distal end portions of the elements 65 and 66 are exposed in the ABS 43 in a position corresponding to the trailing pad 63.

The ABS 43 of the head slider 42 comprises a pair of center rails 68 extending in the first direction X from the intermediate step 56 to the trailing step 62. The center rails 68 are located individually on the opposite sides of central axis D of the head slider 42 and face each other across a gap in the second direction Y. The center rails 68 are formed so that its height above the bottom surface of the negative-pressure cavity 54 is the same as those of the intermediate step 56 and trailing pad 63. A guide groove 76 that guides the airflow to the trailing step 62 and trailing pad 63 is formed between the pair of center rails 68. The guide groove 76 is formed along central axis D and extends through the negative-pressure groove 50 to the leading step 52.

As shown in FIGS. 5 to 7, a first groove 70 is formed along a first step portion 71 that defines the boundary between the trailing pad 63, which comprises the ABS 43 in which the respective ends of the recording element 65 and reproduction element 66 are exposed, and the upper surface of the trailing step 62. Thus, the first groove 70 is continuously formed so as to surround the trailing pad 63, and comprises a portion that extends transversely relative to the head slider 42, that is, in the direction Y, between the outflow end face 42b of the trailing step 62 and the outflow end 63a of the trailing pad 63, and a portion that extends from the outflow end 63a of the trailing pad 63 toward the inflow end.

Further, a second groove 74 is formed along a second step portion 72 that defines the boundary between the trailing step 62 and center rails 68 and the bottom surface of the negative-pressure cavity 54. The second groove 74 is continuously formed on the opposite sides of the trailing step 62 and center rails 68 so as to surround them. The first and second grooves 70 and 74 can be formed by semiconductor processing technologies, such as ion milling.

In the present embodiment, the ABS 43, including the surface of the trailing pad 63 in which the respective distal ends of the recording and reproduction elements 65 and 66 are exposed, is formed so that its arithmetic surface roughness is greater than the surface roughness of other portions of the head slider 42, e.g., the upper surface of the trailing step 62 and the bottom surface of the negative-pressure cavity 54 in this case.

According to the HDD constructed in this manner, each magnetic head 40 is caused to fly by the airflow C that is produced between the disk surface and the ABS 43 as the magnetic disk 16 rotates. When the HDD is operating, therefore, the ABS 43 of the slider 42 is always opposed to the disk surface with a gap therebetween. The magnetic head 40 flies with the recording and reproduction elements of the head section 44 inclined to be closest to the surface of the disk 16. In this flying state, the intermediate step 56 of the head slider 42 is located farther from the disk surface than the recording and reproduction elements.

In general, a strong airflow is produced above the ABS 43 of the head slider 42 while the magnetic head 40 is running above the magnetic disk 16, so that an adhering liquid (magnetic disk lubricant or the like), if any, flows and does not easily accumulate. However, the airflow above the upper surface of the trailing step 62 and the bottom surface of the negative-pressure cavity 54 is relatively weak, so that the liquid easily accumulates. The adhering liquid on the upper surface of the trailing step 62 and the bottom surface of the negative-pressure cavity 54 diffuses and forms a film on the ABS 43 when the magnetic head 40 is unloaded and retracted from above the magnetic disk 16. Thereupon, the flying height of the head 40 increases by a margin equivalent to the thickness of the formed film at the time of loading (drive startup), so that the read/write properties are degraded.

According to the embodiment described above, therefore, the first groove 70 is disposed around the trailing pad 63, and the second groove 74 around the trailing step 62. Thus, diffusion of the liquid into the first and second grooves 70 and 74 can be enhanced by a capillary phenomenon, whereby the liquid adhering to the upper surface of the trailing step 62 and the bottom surface of the negative-pressure cavity 54 can be prevented from diffusing to the ABS 43. Since the first groove 70 is disposed between the outflow end face 42b and trailing pad 63 of the head slider 42, moreover, the adhering liquid on the outflow end face 42b can be prevented from diffusing to the surface of the trailing pad 63.

Example 1

A first groove 70 was formed in a first step portion 71 of a head slider 42, and a second groove 74 in a second step portion 72. The first and second grooves 70 and 74 were 5 μm wide and 100 nm deep. The capillary phenomenon caused by each groove can be promoted by increasing the Laplace pressure, and the curvature radius of each groove should preferably be small. To this end, each groove should preferably be 5 μm wide or less and 4 nm deep or more. If the lubricant on the surface of the magnetic disk 16 adheres to the magnetic heads 40, a monolayer is about 2 nm. To obtain a diffusion barrier effect for the ABS 43, the depth of the first and second grooves 70 and 74 should preferably be twice the thickness of the monolayer film, that is, 4 nm or more.

If restrictions on the processing technologies are ignored, the lower limit of the width of the first and second grooves 70 and 74 should preferably be 100 nm or more. This is because the diameters of relatively large drops of liquid adhering to the magnetic heads are supposed to be about 100 nm, so that the liquid is bound to diffuse beyond the grooves to the ABS 43 if the grooves are too narrow.

Example 2

A first groove 70 was formed only in a first step portion 71 of a head slider 42. The first groove 70 was 5 μm wide and 100 nm deep. Since what influences the flying height of each magnetic head 40 is an ABS 43 of the head slider 42, the first groove 70 is formed at least in the first step portion 71. Formation of a second groove in a second step portion 72 is omitted to achieve cost reduction.

Example 3

A first groove 70 was formed in the same manner as in Example 1, and the surface roughness of an ABS 43 (a surface of a trailing pad 63) was made lower than that of the upper surface of a trailing step 62 and the bottom surface of a negative-pressure cavity 54. In a roughness measurement using an atomic force microscope (AFM), mean arithmetic roughness Ra of the ABS 43 was 0.5 nm (5 μm□) and that of the upper surface of the trailing step 62 and the bottom surface of the negative-pressure cavity 54 was 2 nm (5 μm□).

The surface roughness can be controlled by, for example, changing etching conditions for smear removal at the end of processing of the ABS of the head slider 42. Since diffusion of an adhering liquid advances with an increase in surface energy, the surface energy of the ABS 43 should preferably be made relatively low. This can be effectively achieved by making the surface roughness of the ABS 43 relatively low.

Example 4

First and second grooves 70 and 74 along first and second step portions 71 and 72 were formed in the same manner as in Example 1. Each of the grooves was 10 nm wide and 100 nm deep.

Comparative Example 1

A magnetic head comprising neither of first and second grooves were prepared.

The magnetic heads of Examples 1 to 4 and Comparative Example 1 were inspected for flying height fluctuation. The magnetic heads of Examples 1 to 4 and Comparative Example 1 were installed individually in magnetic disk drives. After 150 hours of operation at high temperature (60° C.), the disk drives were cooled to normal temperature (20° C.) and left for 10 hours with the magnetic heads retracted from magnetic disks (or unloaded). Thereafter, the disk drives were started up so that the magnetic heads are run along the outer peripheries of the disks (or loaded), and changes in flying height were measured for about two hours, starting immediately after the startup. FIGS. 8 and 9 show typical results of the measurement.

If the flying height (FH) of each magnetic head 40 immediately after startup is 0 (reference), the flying height is first reduced and then ceases to change and is stabilized in one or two hours. In other words, the flying height of the magnetic head immediately after startup is greater than that during normal head operation. This is because an adhering liquid diffuses to the ABS of the head slider and forms a film when the head is unloaded and the flying height of the head increases by a margin equivalent to the thickness of the film immediately after startup. However, the adhering liquid film is carried away from the ABS 43 by airflow with the passage of time, whereupon the head flying height is restored to the level reached without adhesion. Flying height variation (ΔFH) caused before the flying height of each magnetic head of the disk drive having just been started up is stabilized was evaluated for each of the Examples and Comparative Examples.

As can be seen from FIGS. 8 and 9, any of the flying height variations (ΔFH) of Examples 1 to 4 is less than that of Comparative Example 1. The flying height variation (ΔFH) of the magnetic head was found to be minimal in Example 3, in which the grooves are formed in both of the first and second step portions 71 and 72 and the surface roughness of the ABS 43 is reduced. In Example 4 in which the first and second grooves are as wide as 10 nm, moreover, the flying height variation (ΔFH), although increased, was less than in Comparative Example 1, thus exhibiting an effect of groove formation.

Thus, according to the present embodiment, there may be provided a magnetic head, head gimbal assembly, and magnetic disk drive with improved reliability, in which the flying height cannot easily change if a liquid, such as a lubricant, adheres to the head and which can perform stable recording and production.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the head slider is not limited to femto-sliders and may also be applied to pico-sliders, pemto-sliders, or other larger sliders. The shapes, sizes, etc., of the trailing step, trailing pad, and other parts of the head slider may be changed if necessary. The number of magnetic disks used in the disk drive is not limited to one and may be increased as required.

What is claimed is:

1. A magnetic head comprising:
a head slider comprising a bearing surface opposed to a surface of a recording medium, an inflow end face, and an outflow end face, and configured to fly by an airflow between the recording medium surface and the bearing surface; and
a recording element and a reproduction element disposed in an outflow end portion of the head slider with respect to the airflow,
the bearing surface of the head slider comprising a trailing step on the outflow end portion, a trailing pad on the trailing step wherein the trailing pad has a bearing surface located at a different elevation than bearing surface of the trailing step and comprising an outflow end kept at an inflow-side gap away from the outflow end face, and a first groove being 5 μm wide or less but greater than zero μm and formed along a step portion at a boundary between the trailing step and the trailing pad.

2. The magnetic head of claim 1, wherein a surface roughness of the trailing pad is lower than that of an upper surface of the trailing step.

3. The magnetic head of claim 2, wherein the first groove is 4 nm deep or more.

4. The magnetic head of claim 2, wherein the bearing surface of the head slider comprises a negative-pressure cavity defined by a recess, the trailing step projects from a bottom surface of the negative-pressure cavity, and the bearing surface of the head slider comprises a second groove being 5 μm wide or less and formed along a step portion at a boundary between the bottom surface of the negative-pressure cavity and the trailing step.

5. The magnetic head of claim 4, wherein a surface roughness of the trailing pad is lower than that of the bottom surface of the negative-pressure cavity.

6. The magnetic head of claim 5, wherein the second groove is 4 nm deep or more.

7. The magnetic head of claim 6, wherein the recording and reproduction elements are partially exposed in the trailing pad.

8. A head gimbal assembly comprising:
the magnetic head of claim 2; and
a suspension configured to support the magnetic head with the aid of a gimbal.

9. A disk drive comprising:
a disk recording medium;
a drive section configured to rotate the recording medium; and
the magnetic head of claim 2, configured to perform data processing on the recording medium.

10. A head gimbal assembly comprising:
the magnetic head of claim 1; and
a suspension configured to support the magnetic head with the aid of a gimbal.

11. A disk drive comprising:
a disk recording medium;
a drive section configured to rotate the recording medium; and
the magnetic head of claim 1, configured to perform data processing on the recording medium.

12. The magnetic head of claim 1, wherein the recording and reproduction elements are partially exposed in the trailing pad.

13. The magnetic head of claim 1, wherein the first groove is 4 nm deep or more.

14. The magnetic head of claim 1, wherein the bearing surface of the head slider comprises a negative-pressure cavity defined by a recess, the trailing step projects from a bottom surface of the negative-pressure cavity, and the bearing surface of the head slider comprises a second groove being 5 μm wide or less and formed along a step portion at a boundary between the bottom surface of the negative-pressure cavity and the trailing step.

15. A head gimbal assembly comprising:
the magnetic head of claim 14; and
a suspension configured to support the magnetic head with the aid of a gimbal.

16. The magnetic head of claim 14, wherein the second groove is 4 nm deep or more.

17. The magnetic head of claim 14, wherein a surface roughness of the trailing pad is lower than that of the bottom surface of the negative-pressure cavity.

18. The magnetic head of claim 17, wherein the second groove is 4 nm deep or more.

19. The magnetic head of claim 18, wherein the recording and reproduction elements are partially exposed in the trailing pad.

20. A disk drive comprising:
a disk recording medium;
a drive section configured to rotate the recording medium; and
the magnetic head of claim 14, configured to perform data processing on the recording medium.

* * * * *